United States Patent
Duan et al.

(10) Patent No.: US 10,329,407 B2
(45) Date of Patent: Jun. 25, 2019

(54) DEGRADABLE EXTRUSION RESISTANT COMPOSITIONS AND ARTICLES OF MANUFACTURE

(71) Applicants: Ping Duan, Cypress, TX (US); Anil K. Sadana, Houston, TX (US); Suman Khatiwada, Houston, TX (US); Yingqing Xu, Tomball, TX (US); Xiao Wang, Houston, TX (US)

(72) Inventors: Ping Duan, Cypress, TX (US); Anil K. Sadana, Houston, TX (US); Suman Khatiwada, Houston, TX (US); Yingqing Xu, Tomball, TX (US); Xiao Wang, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 567 days.

(21) Appl. No.: 14/953,472

(22) Filed: Nov. 30, 2015

(65) Prior Publication Data
US 2017/0152371 A1    Jun. 1, 2017

(51) Int. Cl.
| | |
|---|---|
| *C08K 7/14* | (2006.01) |
| *B29C 43/00* | (2006.01) |
| *E21B 41/00* | (2006.01) |
| *C08K 3/16* | (2006.01) |
| *E21B 33/00* | (2006.01) |
| *E21B 33/12* | (2006.01) |
| *E21B 34/00* | (2006.01) |
| *B29K 105/00* | (2006.01) |

(52) U.S. Cl.
CPC .............. *C08K 7/14* (2013.01); *B29C 43/003* (2013.01); *C08K 3/16* (2013.01); *E21B 33/00* (2013.01); *E21B 33/1208* (2013.01); *E21B 34/00* (2013.01); *E21B 41/00* (2013.01); *B29K 2105/0002* (2013.01); *B29K 2105/0067* (2013.01); *B29K 2995/006* (2013.01)

(58) Field of Classification Search
None
See application file for complete search history.

(56) References Cited

U.S. PATENT DOCUMENTS

| | | | |
|---|---|---|---|
| 2007/0270537 A1* | 11/2007 | Suzuki | C08L 75/04 524/481 |
| 2011/0053809 A1 | 3/2011 | Sanders et al. | |
| 2011/0155374 A1 | 6/2011 | Mackay | |
| 2012/0029145 A1* | 2/2012 | Brown | B29C 47/0004 524/590 |
| 2014/0099277 A1 | 4/2014 | Adhikari et al. | |
| 2014/0329084 A1* | 11/2014 | Poncet | C08G 18/302 428/341 |
| 2015/0112010 A1 | 4/2015 | Johnston et al. | |
| 2016/0251934 A1* | 9/2016 | Walton | E21B 33/12 166/376 |
| 2017/0174895 A1* | 6/2017 | Fornera | C01F 11/185 |

FOREIGN PATENT DOCUMENTS

CN    103361037    10/2013

OTHER PUBLICATIONS

International Search Report and Written Opinion, International Application No. PCT/US2016/057065, dated Jan. 20, 2017, Korean Intellectual Property Office; International Search Report 5 pages, Written Opinion 6 pages.

Valerio, et al. "Degradable polyurethane nanoparticles containing vegetable oils", European Journal of Lipid Science and Technology, Jan. 2014, vol. 116; 8 pages.

* cited by examiner

*Primary Examiner* — Robert T Butcher
(74) *Attorney, Agent, or Firm* — Cantor Colburn LLP

(57) ABSTRACT

A degradable polymer composition comprises a polyurethane comprising ester groups in a backbone of the polyurethane and carboxylic acid groups attached to the backbone of the polyurethane; and a filler comprising one or more of the following: a powder comprising particles having an average particle size of about 5 microns to about 500 microns; or a fiber having an average length of about ⅛ inch to about 5 inches. Also disclosed are articles comprising the composition. A method to degrade the article includes exposing the article to a fluid at a temperature of about 25° C. to about 300° C.

21 Claims, 4 Drawing Sheets

DEGRADABLE EXTRUSION RESISTANT COMPOSITIONS AND ARTICLES OF MANUFACTURE

BACKGROUND

Downhole constructions including oil and natural gas wells, $CO_2$ sequestration boreholes, etc. often utilize borehole components or tools that, due to their function, are only required to have limited service lives that are considerably less than the service life of the well. After a component or tool service function is complete, it must be removed or disposed of in order to recover the original size of the fluid pathway for uses such as hydrocarbon production and $CO_2$ sequestration. Disposal of components or tools can be accomplished by milling or drilling the component or by tripping the tool out of the borehole. Each of these is generally time consuming and expensive. The industry would be receptive to new materials, and methods that remove a component or tool from a borehole without such milling and drilling operations.

BRIEF DESCRIPTION

In an embodiment, a degradable polymer composition comprises a polyurethane comprising ester groups in a backbone of the polyurethane and carboxylic acid groups attached to the backbone of the polyurethane; and a filler comprising one or more of the following: a powder comprising particles having an average particle size of about 5 microns to about 500 microns; or a fiber having an average length of about ⅛ inch to about 5 inches.

Also disclosed is a degradable article comprising the polymer composition.

A method of manufacturing the degradable article comprises: compressing a combination of a filler and a polyurethane forming composition at a temperature of about 20° C. to about 150° C. and a pressure of about 100 psi to about 10,000 psi to provide a molded part; and heating the molded part at a temperature of about 60° C. to about 150° C. to provide the degradable article; wherein the polyurethane forming composition comprises a first composition comprising a polyol component, a polyisocyanate component, and a first carboxylic acid functionalized alcohol; or a second composition comprising a polyurethane prepolymer, a curative, and a second carboxylic acid functionalized alcohol, or a combination of the first composition and the second composition.

A method to degrade an article comprises: exposing the article to a fluid at a temperature of about 25° C. to about 300° C., wherein the article comprises a polyurethane that has ester groups in a backbone of the polyurethane and carboxylic acid groups attached to the backbone of the polyurethane; and a filler comprising one or more of the following: a powder comprising particles having an average particle size of about 5 microns to about 500 microns; or a fiber having an average length of about ⅛ inch to about 5 inches.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
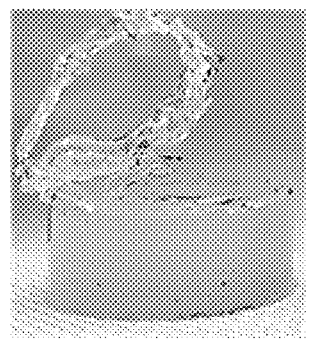
FIG. 1A shows a conventional polyurethane sample after an API extrusion test at 275° C. and 8,000 psi for 2 hours.

Disclosed herein are degradable polymer compositions that may be used in a wide variety of applications and environments, including use in various subterranean environments to make selectively and controllably disposable or degradable tools or other components. These polymer compositions include a polyurethane and a filler comprising a powder, or a fiber, or a combination thereof. The powder comprises particles having an average particle size of about 5 microns to about 500 microns, and the fiber has an average length of about ⅛ inch to about 5 inches. The polyurethane comprises ester groups on a backbone of the polyurethane and carboxylic acid groups attached to the backbone of the polyurethane.

The polymer compositions provide a unique and advantageous combination of high extrusion resistance and rapid and controlled disintegration in various fluids comprising water or brine at elevated temperatures. Conventional polyurethanes having ester groups may degrade at temperatures greater than 200° F. However, the degradation may take more than a month; and the degradation products contain solids, which may not be easily removed. In addition, conventional polyurethanes may not have the extrusion resistance desired for certain applications. Advantageously, the polymer compositions of the disclosure can degrade at lower temperatures, for example at a temperature equal to or less than 200° F. within a few days, which makes the compositions or articles comprising the composition suitable for use in low temperature wells. In addition, the tools or articles comprising the polymer compositions have high extrusion resistance, and maintain their geometry with acceptable but degrading mechanical properties until they are no longer needed. In a further advantageous feature, the polymer composition can fully disintegrate into liquids, allowing an easy and clean removal of the articles or tools once they are no longer needed.

The polyurethane component in the degradable polymer composition comprises ester groups in a backbone of the polyurethane and carboxylic acid groups attached to the backbone of the polyurethane. The ester groups presented in the polyurethane are controllable by combinations of different ratios of polyol, diisocyanates and chain extenders or by combinations of different ratios of ester polyurethane pre-polymer and ether polyurethane pre-polymer, followed by curing polyurethane pre-polymer with curatives. The ratio between two separate portions of chemical reactants which are referred to herein as the isocyanate portion and polyol portion may, in one non-limiting embodiment, be chemically balanced close to 1:1 according to their respective equivalent weights. The equivalent weight of the isocyanate portion is calculated from the percentage of NCO (isocyanate) content. The equivalent weight of the polyol portion is calculated by adding the equivalent weights of all reactive components together in the polyol portion, which includes polyol and chain extender.

The carboxylic acid groups are present in an amount of about 1 wt. % to about 15 wt. %, or about 2 wt. % to about 12 wt. %, based on the total weight of the polyurethane. Without wishing to be bound by theory, it is believed that when the polyurethane has carboxylic acid groups within these ranges, a composition containing the polyurethane and the filler disclosed herein provides balanced degradation rate and extrusion resistance.

As used herein, a backbone of the polyurethane refers to a main chain of the polyurethane comprising covalently bounded atoms that together create a continuous polymer chain of the molecule. In an embodiment, the carboxylic acid groups are covalently bounded to the backbone of the polyurethane. One or more intervening groups or atoms can be present between the backbone of the polyurethane and the carboxylic acid functional groups. In a specific embodiment, the carboxylic acid groups are directly bounded to the backbone of the polyurethane without any intervening atoms.

The polyurethane can be derived from a polyurethane forming composition comprising a polyisocyanate, a polyol, and a carboxylic acid functionalized alcohol wherein at least one of the polyisocyanate and the polyol comprise polyester groups. Alternatively or in addition, the polyurethane forming composition comprises a polyurethane prepolymer, a curative, and a carboxylic acid functionalized alcohol as a chain extender.

The polyisocyanate may be one or more of any of a number of polyisocyanates that are known for applications in the production of polyurethanes. Exemplary polyisocyanates include, but are not limited to aromatic polyisocyanates, such as diphenylmethane diisocyanate (MDI, e.g., 4,4'-MDI, blends of 4,4'-MDI and 2,4'-MDI), MDI prepolymer, and modified polymeric MDI containing monomeric MDI, toluene diisocyanate (TDI), p-phenylene diisocyanate (PPDI), naphthalene diisocyanate (NDI), and o-tolidine diisocyanate (TODI), as well as aliphatic polyisocyanates such as 1,6-hexamethylene diisocyanate (HDI), isophorone diisocyanate (IPDI), tetramethylxylene diisocyanate (TMXDI), and cyclohexane diisocyanate (CHDI). Mixtures of any of the aforementioned polyisocyanates or other known polyisocyanates may also be used. In an exemplary embodiment, the polyisocyanate is a modified MDI (e.g., MONDUR PC sold by Bayer) or MDI prepolymer (e.g., LUPRANATE 5040 sold by BASF). The polyisocyanate can contain ester groups.

The polyol portion may include, but not necessarily be limited to, polyether polyols (e.g., prepared by reaction of ethylene oxide and/or propylene oxide with polyol initiators such as propylene glycol, glycerine, sorbitol, or sucrose, to name a few), polyester polyols (e.g., prepared by polyesterification of low molecular weight polyacids such as malonic acid, succinic acid, adipic acid, carballylic acid with low molecular weight polyols such as propylene glycol, 1,4-butane diol, and the like, and also polycaprolactone polyols), polycarbonate polyols, polybutadiene polyols, and the like.

In an exemplary embodiment, ester linkages in the backbone of the polyurethane are incorporated by including a polyester polyol in the reaction mixture. In a further exemplary embodiment, a polyester polyol in a polyurethane reaction mixture may have a molecular weight of from 1000 to 2000 and an OH number of from 50 to 130. Exemplary polyester polyols include, but are not limited to FOMREZ 45, FOMREZ 1023-63, FOMREZ 1066-187, and FOMREZ 1066-560 from Chemtura.

Alternatively or in addition, the polyurethane material may also be formed by reacting polyurethane prepolymers, curatives, and a carboxylic acid functionalized alcohol. Polyurethane prepolymers are formed by reacting polyols with diisocyanates. In an embodiment, the polyurethane prepolymers have reactive isocyanate end groups and are formed by reacting a stoichiometric excess of a diisocyanate as described herein with a polyol as described herein. These polyurethane prepolymers are generally stable in a closed container, but reactive when they are contacted with chemicals such as water, diols, diamines, etc., forming high molecular polymers. In an embodiment, the polyurethane prepolymer is a TDI-based polyester containing reactive isocyanate end groups. Polyurethane prepolymers are commercially available from companies such as Bayer Corporation or BASF or Chemtura Corporation.

The polyurethane prepolymers containing isocyanate ended reactive groups can react with curatives including diols such as 1,4-butanediol, 1,3-propanediol, hydroquinone bis (beta-hydroxyethyl) ether (HQEE), or di-amines such as 4,4-methylene bis (2-chloroaniline) "MOCA", 1,3 Propanediol bis-(4-aminobenzoate), diethyltoluenediamine, dimethylthiotoluenediamine. In an embodiment the polyurethane prepolymer containing isocyanate ended reactive groups is used in combination with a polyisocyanate as described herein to further adjust the degradation properties of the polymer composition.

By using the carboxylic acid functionalized alcohol, carboxylic acid groups are incorporated into the polyurethane molecular backbone. In an embodiment, carboxylic acid groups are introduced through di-functional hydroxyl groups which react with polyisocyanates or polyurethane prepolymers as shown in the following scheme:

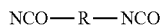
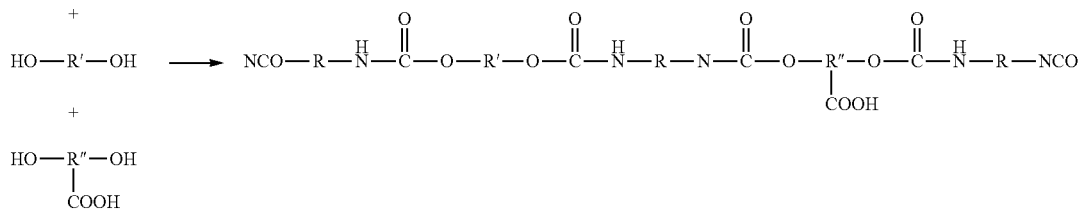

In the above reaction, NCO—R—NCO represents a polyisocyanate or a polyurethane prepolymer having reactive isocyanate end groups. Compound HO—R'—OH can represent a polyol or a curative for the prepolymer, and HO—R"(COOH)—OH represents the carboxylic acid functionalized alcohol, wherein R, R', and R" are independently organic divalent radicals. Without wishing to be bound by theory, it is believed that the incorporation of carboxylic acid groups into the backbone of the polyurethane contributes to the improved degradation of the polymer composition.

The carboxylic acid functionalized alcohol can comprise at least two hydroxyl groups. In an embodiment, the carboxylic acid functionalized alcohol comprises 2,2-bis(hydroxymethyl)propionic acid (DMPA).

Polyurethane forming compositions may also include small amounts of chain-extenders (low molecular weight diols or diamines) such as 1,4-butanediol, 1,3-propanediol, ethylene glycol, propylene glycol, ethanolamine, or diethyltoluenediamine, or dimethylthiotoluenediamine (DMTDA). Other suitable chain extenders include but are not limited to 4,4'-Methylene bis (2-chloroaniline), "MOCA", sold by Chemtura under the commercial name VIBRA-CURE A 133 HS, and trimethylene glycol di-p-aminobenzoate, "MCDEA", sold by Air Products under the commercial name VERSALINK 740M. The polyurethane forming composition may also include cross-linkers (low molecular weight polyfunctional alcohols or amines) such as trimethylol propane (TMP), triethanolamine (TEA), or N,N,N',N'-tetrakis(2-hydroxypropyl) ethylenediamine. Catalysts, such as amine catalysts (e.g., tertiary amines such as triethylenediamine), organometallic catalysts, trimerization catalysts (e.g., 1,3,5-(tris(3-dimethylamino)propyl)-hexahydro-s-triazine) may also be included in the reaction mixture.

Other additives such as surfactants, flame retardants, stabilizers, and others as known in the art, may be used in the polyurethane forming composition depending on the specifications for the end-use application. For example, a conventional amount of surfactant, e.g., 0.5% of total weight, such as the surfactant sold under the commercial name DABCO DC-198 by Air Products and a small amount of cell opener, e.g., 0.5% of total weight, such as the cell opener sold under the commercial names ORTEGOL 500, ORTEGOL 501, TEGOSTAB B8935, TEGOSTAB B8871, and TEGOSTAB B8934 by Degussa may be added into the formulations to control foam cell structure, distribution and openness. DABCO DC-198 is a silicone-based surfactant from Air Products. Other suitable surfactants include, but are not necessarily limited to, fluorosurfactants sold by DuPont under commercial names ZONYL 8857A and ZONYL FSO-100. Colorant may be added in the polyol portion to provide desired color in the finished products. Such colorants are commercially available from companies such as Milliken Chemical which sells suitable colorants under the commercial name REACTINT.

In a non-restrictive embodiment, the isocyanate portion may contain modified MDI such as MONDUR PC sold by Bayer or MDI prepolymer such as LUPRANATE 5040 sold by BASF or MONDUR 501 sold by Bayer (an isocyanate-terminated MDI polyester prepolymer), and the polyol portion may contain (1) a polyether or polyester or polycarbonate polyol; (2) a tri-functional hydroxyl cross linker such as trimethylolpropane (TMP); (3) an chain extender such as 1,4-butanediol; and (4) a carboxylic acid functionalized alcohol such as 2,2-bis(hydroxymethyl)propionic acid (DMPA). Other additives may include catalyst, fillers, lubricants, colorants, etc.

In another non-restrictive embodiment, the polyurethane forming composition comprises a TDI-terminated polyester prepolymer such as ADIPRENE 1950A from Chemtura Corporation; a curative such as hydroquinone bis (beta-hydroxyethyl) ether (HQEE) or 1,4-butanediol; a tri-functional hydroxyl cross linker such as trimethylolpropane (TMP); a carboxylic acid functionalized alcohol such as 2,2-bis(hydroxymethyl)propionic acid (DMPA); and optionally a polyisocyanate, for example, a MDI prepolymer such as LUPRANATE 5040 sold by BASF or MONDUR 501 sold by Bayer (an isocyanate-terminated MDI polyester prepolymer).

The amount of polyisocyanate and/or the polyurethane prepolymer used in the polyurethane-forming composition can vary, depending upon the particular application for which the polyurethane is being prepared. In general, the total —NCO equivalents to total active hydroxyl equivalents is such as to provide a ratio of 0.8 to 1.2 equivalents of —NCO per equivalent of active hydroxyl groups, and preferably a ratio of about 1.0 to 1.08 equivalents of —NCO per active hydroxyl. The active hydroxyl groups can be provided by polyols, cross linking agents, chain extenders, carboxylic acid functionalized alcohols, or a combination comprising at least one of the foregoing.

The fillers can comprise a powder, a fiber, or a combination thereof. The filler powders include organic or inorganic materials. In an embodiment, the powder is dissolvable. In another embodiment, the powder is not dissolvable. As used herein, a material is dissolvable means that the material is soluble in water or reacts with water and/or the polyurethane to form compounds that are soluble in water. A compound is soluble if it dissolves in water to provide a solution with a concentration of at least 0.1 moles per liter at room temperature for example at 23° C. The filler powders include inorganic salts, organic or inorganic acids, organic or inorganic bases. Exemplary materials for the filler powder include sodium chloride, silicates, calcium oxide, aluminum hydroxide oxide, alumina, adipic acid, succinic acid, or a combination comprising at least one of the foregoing. In an exemplified embodiment, the silicate is mesoporous silica having an average pore size of having an average pore size of about 5 nanometers to about 50 nanometers. In another embodiment, the silicate is a dissolvable silicate. Dissolvable silicates are generally not distinct stoichiometric chemical substances. The dissolvable silicate can comprise about 55 to about 80 wt. % of $SiO_2$, 0 to about 35 wt. % of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, about 20 wt. % to about 35 wt. %, or about 22 wt. % to about 33 wt. %, wherein each weight percent is based on the total weight of the dissolvable silicates. The general formula for dissolvable alkali silicates is $M_2O \cdot xSiO_2$, where M is Na, K, or Li, and x is the molar ratio defining the number of moles silica ($SiO_2$) per mole of alkali metal oxide ($M_2O$). In an embodiment, the dissolvable silicates comprise at least one of sodium silicate or potassium silicate. Preferably the dissolvable silicates comprise sodium silicate having a formula of $Na_2O \cdot SiO_2$, wherein the weight percent of $SiO_2$ relative to $Na_2O$ is about 3.22:1 to about 1:1, about 3.22:1 to about 2.5:1, specifically about 2:1 to about 1:1.

In an embodiment, the filler powder comprises particles having an average particle size of about 5 microns to about 500 microns, or about 10 microns to about 200 microns, or about 30 microns to about 200 microns. Particle size can be determined by an appropriate method of sizing particles such as, for example, static or dynamic light scattering (SLS or DLS) using a laser light source. Without wishing to be bound by theory, it is believed that when the fillers are within these size ranges the polymer compositions have optimized degradation rate for subterranean applications.

The fibers have an average length of about ⅛ inch to about 5 inches, about ⅛ inch to about 2 inches, about ⅛ inch to about 1 inch, or about ¼ inch to about ½ inch. The fibers can have a round or flat cross-section. The average diameter of the fiber ranges from about 5 to about 50 microns. As used herein, the average diameter refers to the average largest dimension of the cross-section of the fibers.

The fiber includes one or more of the following: carbon fibers; glass fibers; or polymer fibers. Exemplary materials for polymer fibers include polyimide, polyester, nylon, polycarbonate, polypropylene fiber, and cotton. In a specific embodiment, the fiber comprises glass fiber having an average length of about ⅛ inch to about 1 inch or about ¼ inch to about ½ inch. The materials for the glass fibers can be dissolvable silicates described herein.

To improve the extrusion resistance of the polymer composition, the filler powder can be used together with fibers. The relative weight ratio of the fillers in the powder form and the fillers in the fiber form is about 10:1 to 1:10, about 10:1 to about 1:1, or about 8:1 to about 2:1.

The amounts of the polyurethane and the filler including the filler powder and fibers can be adjusted to balance the degradation rate and the desirable physical properties of the composition. Generally, polymer compositions having a lower polymer/filler ratio are likely to have a higher degradation rate and a higher mechanical strength. However, the presence of large amounts of fillers can make the polymer composition too brittle to be useful for certain applications. In an embodiment, the weight ratio of the polymer component relative to the filler in the polymer composition is about 50:1 to about 1:1, about 20:1 to about 2:1, or about 10:1 to about 5:1.

The polymer compositions are useful for producing degradable articles. In an embodiment, the articles degrade at a temperature of equal to or lower than about 200° F. in a fluid in less than or equal to about 15 days, in less than or equal to about 10 days, in less than or equal to about 8 days, or in less than or equal to about 5 days. Advantageously, the articles can fully disintegrate into liquids at a temperature of less than or equal to about 200° F. when exposed to a fluid comprising water or brine in less than about 15 days, less than about 10 days, or less than about 8 days.

Figure 1B:
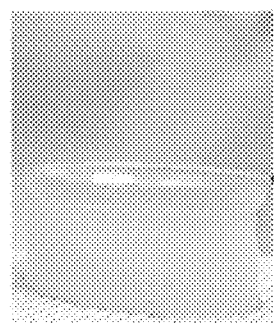
FIG. 1B shows a sample containing the polyurethane of the disclosure and mesoporous silica after an API extrusion test at 275° C. and 8,000 psi for 2 hours.

Articles comprising the polymer compositions can have excellent extrusion resistance. FIG. 1A shows a conventional polyurethane sample after an API extrusion test at 275° C. and 8,000 psi for 2 hours; and FIG. 1B shows a sample containing the polyurethane of the disclosure and mesoporous silica after an API extrusion test at 275° C., and 8.000 psi for 2 hours. The figures shown that the conventional polyurethane sample has very poor extrusion resistance whereas a sample containing the polymer composition of disclosure has excellent resistance as no sign of tearing is observed after 2 hours of testing.

Figure 2:
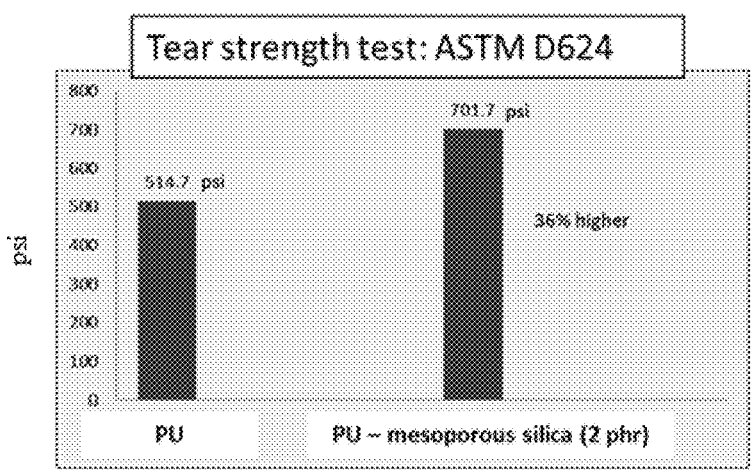
FIG. 2 illustrates the tear strength test results for a conventional polyurethane sample and a sample containing the polyurethane of the disclosure and mesoporous measured according to ASTM D624.

FIG. 2 illustrates the tear strength test results for a conventional polyurethane sample and a sample containing the polyurethane of the disclosure and mesoporous silica, measured according to ASTM D624. As shown in FIG. 2, the tear strength of a sample containing a polymer composition of the disclosure has a tear strength that is 36% higher than the tear strength of a conventional polyurethane sample.

A method of manufacturing the degradable article comprises: compressing a combination of a filler and a polyurethane forming composition at a temperature of about 20° C. to about 150° C. and a pressure of about 100 psi to about 10,000 psi to provide a molded part; and heating the molded part at a temperature of about 80° C. to about 150° C. to provide the degradable article; wherein the polyurethane forming composition comprises a first composition comprising a polyol component, a polyisocyanate component, and a first carboxylic acid functionalized alcohol, or a second composition comprising a polyurethane prepolymer, a curative, and a second carboxylic acid functionalized alcohol, or a combination of the first composition and the second composition. Conventional polyurethane parts are generally made by casting. However, the inventors have found that the parts made by casting methods from a combination of a filler and a polyurethane forming composition can have undesirable voids. Under the process conditions disclosed herein, the articles are substantially free of voids, for example, the articles can contain less than about 5 volume percent of voids, less than about 2 volume percent of voids, less than 1 volume percent of voids, or less than 0.5 volume percent of voids, each based on the total volume of the degradable article.

The obtained articles can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the polymer compositions can be directly molded to the useful shape by choosing the molds having the desired shape.

In an embodiment, the polymer compositions are used to produce articles that can be used as tools or implements, e.g., in a subterranean environment. Exemplary tools include flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, or shear screws.

The article can be a downhole tool. In an embodiment, the tool is a single component. In another embodiment the tool inhibits flow. In yet another embodiment, the tool is pumpable within a subterranean environment.

Pumpable tools include plugs, direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, or darts.

The tools that inhibit flow include seals, high pressure beaded frac screen plugs, screen basepipe plugs, coatings for balls and seats, compression packing elements, expandable packing elements, O-rings, attached seals, bullet seals, subsurface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, or sleeves.

Methods to degrade a polymer composition or an article comprising the polymer composition comprises: exposing the polymer composition or the article to a fluid at a temperature of about 25° C. to about 300° C., about 65° C. to about 250° C., or about 65° C. to about 150° C. or about 175° C. to about 250° C. The pressure can be about 100 psi to about 15,000 psi.

The fluid can comprises water, brine, or a combination comprising at least one of the foregoing. The brine can include NaCl, KCl, NaBr, $MgCl_2$, $CaCl_2$, $CaBr_2$, $ZnBr_2$, $NH_4Cl$, sodium formate, cesium formate, and the like.

Example 1

A degradable polyurethane was formed by combining two separate portions of liquid chemical reactants and reacting them together. These two separate portions are referred to herein as the isocyanate portion and polyol portion. The isocyanate portion consisted MONDUR 501 (72 grams, a MDI-based diisocyanate polyester polymer from Bayer Corporation). The polyol portion consisted of: 1) a polyester polyol FOMREZ 22-56 from Chemtura Corporation (48 grams); 2) 2,2-bis(hydroxymethyl)propionic acid (DMPA, 4.35 grams); 3) 1,1,1-tris(hydroxymethyl)propane (TMP, 4.36 grams); and 4) 1,4-butanediol (4.39 grams). Polyol portion was heated to the temperature about 135-140° C. to allow all the components to become liquid, and then the isocyanate portion was added to the polyol portion. After vigorous mixing for about one minute, the mixture was poured inside a mold. To remove air trapped inside the mixture, mechanical force via a hydraulic press was used to compress the mixture inside the mold. A void-free molded part was obtained after the mixture was cured at an elevated temperature.

Example 2

A degradable polyurethane was prepared from a polyurethane prepolymer and glass fibers. A TDI-terminated polyester prepolymer (ADIPRENE 1950A from Chemtura Corporation having NCO content as 5.45%, 110 grams) was mixed with 2,2-bis(hydroxymethyl)propionic acid (DMPA, 9.34 grams). This mixture was heated slowly to about 135-140° C., followed by the addition of hydroquinone bis (beta-hydroxyethyl) ether (HQEE, 12.81 grams) and 1,1,1-tris(hydroxymethyl)propane (TMP, 5.78 grams). After all the ingredients were molten, ¼" length chopped fiberglass (8.97 grams) was added. After vigorous mixing for about one minute, the mixture was poured inside a mold. To remove air trapped inside the mixture, mechanical force via a hydraulic press was used to compress the mixture inside the mold. A void-free molded part was obtained after the mixture was cured at an elevated temperature.

Example 3

A degradable polyurethane composition was prepared from a polyurethane prepolymer, glass fibers, and dissolvable fine salts. A TDI-terminated polyester prepolymer (ADIPRENE 1950A from Chemtura Corporation having NCO content as 5.45%, 100 g) was mixed with 2,2-bis (hydroxymethyl)propionic acid (DMPA, 7.91 grams). The mixture was heated to about 135-140° C., then 1,4-butanediol (4.93 grams) and 1,1,1-tris(hydroxymethyl) propane (TMP, 4.91 grams) were added. After all the ingredients were molten, chopped fiberglass (3.35 grams) and dissolvable fine salts (16.77 grams) were added. The mixture was poured into a mold. To remove air trapped inside the mixture, mechanical force via a hydraulic press was used to compress the mixture inside the mold. A void-free molded part was obtained after the mixture was cured at an elevated temperature.

Example 4

A degradable polyurethane composition was prepared from a polyurethane prepolymer, a polyisocyanate, glass fibers, and dissolvable fine salts using a method similar to the method described in Example 3. Parts were made using a compression molding method as described in Example 3. As a control, parts were also made using a casting method.

Figure 3A:
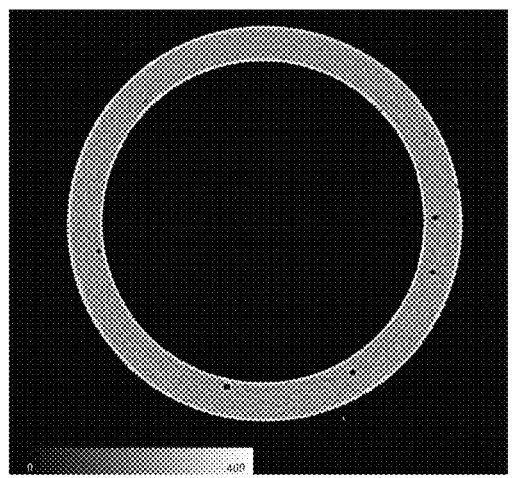
FIG. 3A shows a CT scan of a polyurethane part manufactured using a casting method.
Figure 3B:
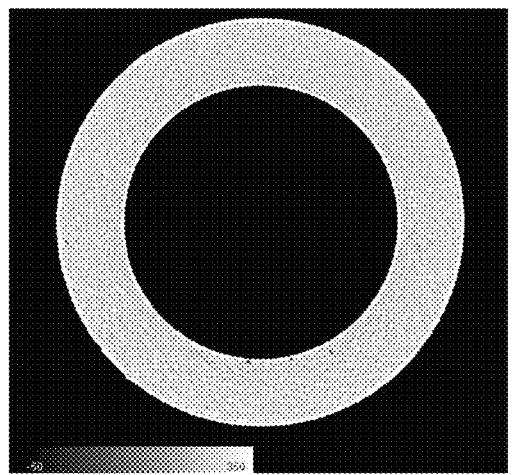
FIG. 3B shows a CT scan of a polyurethane part manufactured using a compression molding method.

CT scan images for samples made via a casting method and a compression molding method are shown in FIGS. 3A and 3B respectively. As shown in FIG. 3A, there are many black dots within the ring (voids) for the part made using the casting method, due to gas trapped within the viscous mixture. As shown in FIG. 3B, a substantially void free sample is made using the compression molding method.

Figure 4:
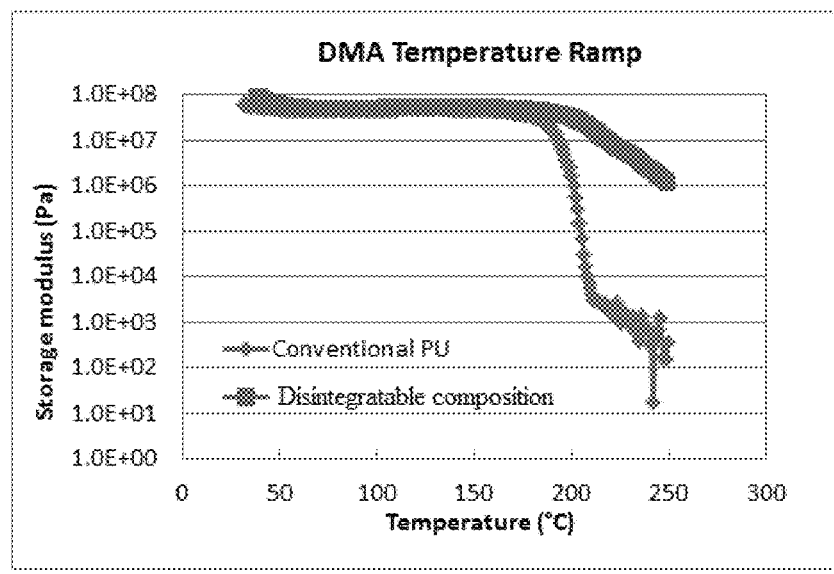
FIG. 4 compares the storage modulus of a part made from a conventional polyurethane and a part made from the degradable polymer composition according to an embodiment of the disclosure.

FIG. 4 compares the storage modulus of a part made from a conventional polyurethane and a part made from the polymer composition of example 4. The part made from the composition of the disclosure has similar modulus as the part made from conventional polyurethane, indicating its good mechanical property.

Figures 5A, 5B, 5C:
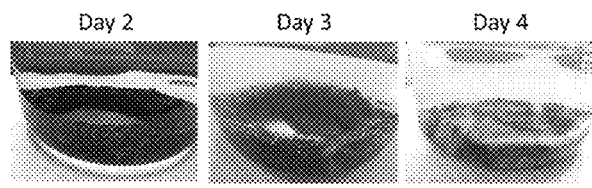
FIGS. 5A-5C are images of a polyurethane sample according to an embodiment of the disclosure after exposed to water at 200° F. for two, three, and four days respectively.
Figures 6A, 6B, 6C, 6D, 6E:
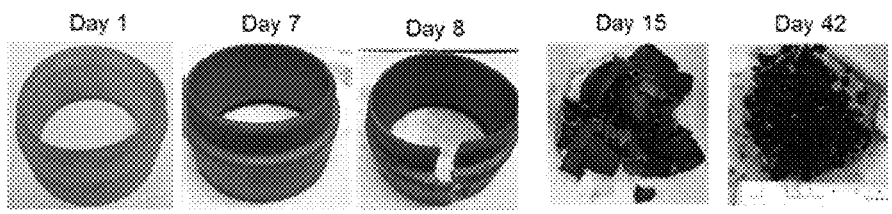
FIGS. 6A-6E are images of a conventional polyurethane sample after exposed to water at 200° F. for one, seven, eight, fifteen, and forty-two clays respectively.
Figures 7A, 7B, 7C, 7D:
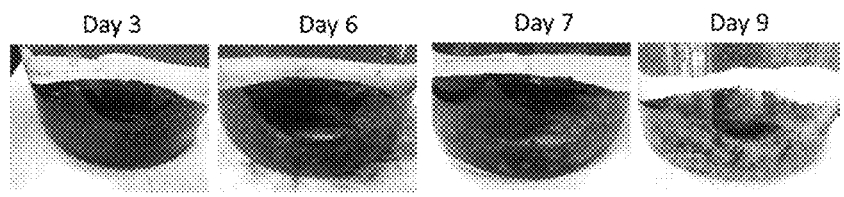
FIGS. 7A-7D are images of a polyurethane sample according to an embodiment of the disclosure after exposed to water at 175° F. for three, six, seven, and nine days respectively.
Figures 8A, 8B, 8C, 8D, 8E:
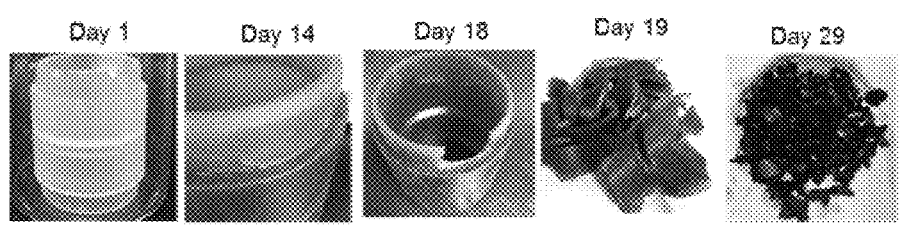
FIGS. 8A-8F are images of a conventional polyurethane sample after exposed to water at 175° F. for one, fourteen, eighteen, nineteen, twenty-nine, and forty-five days respectively.
Figure 8F:

FIGS. 5A-5C are images of a polyurethane sample of Example 4 after exposed to water at 200° F. for two, three, and four days respectively. FIGS. 6A-6E are images of a conventional polyurethane sample after exposed to water at 200° F. for one, seven, eight, fifteen, and forty-two days respectively. FIGS. 7A-7D are images of a polyurethane sample of example 4 after exposed to water at 175° F. for three, six, seven, and nine days respectively. FIGS. 8A-8F are images of a conventional polyurethane sample after being exposed to water at 175° F. for one, fourteen, eighteen, nineteen, twenty-nine, and forty-five days respectively.

As shown in these figures, the samples containing the degradable composition of the disclosure takes only 4 days to turn into a liquid at 200° F. and takes 9 days to turn into a liquid at 175° F., indicating that the degradable polymer composition of the disclose or articles containing the same not only have good mechanical property but also have excellent degradation property. In contrast, the samples containing the conventional polyurethane do not turn into a liquid at all exposing to water at 200° F. for 42 days. After exposing to water at 200° F. for 8 days, the sample containing the conventional polyurethane just starts to disintegrate. After 15 days, the sample breaks into large black pieces. After 42 days, many relatively large chunks are remained After exposing to water at 175° F. for 18 days, a sample containing a conventional polyurethane just starts to disintegrate. After 19 days, the sample breaks into very large pieces. After 45 days, many relatively large chunks are still present.

Embodiment 1

A degradable polymer composition comprising:
a polyurethane comprising ester groups in a backbone of the polyurethane and carboxylic acid groups attached to the backbone of the polyurethane; and
a filler comprising one or more of the following: a powder comprising particles having an average size of about 5 microns to about 500 microns; or a fiber having an average length of about 1/8 inch to about 5 inches.

Embodiment 2

The composition of embodiment 1, wherein the carboxylic acid groups are present in an amount of about 1 wt. % to about 15 wt. % based on the total weight of the polyurethane.

Embodiment 3

The composition of embodiment 1 or embodiment 2, wherein the polyurethane is derived from a polyisocyanate, a polyol, and a carboxylic acid functionalized alcohol, and wherein at least one of the polyisocyanate and the polyol comprise polyester groups.

Embodiment 4

The composition of embodiment 1 or embodiment 2, wherein the polyurethane is derived from a polyurethane prepolymer, a curative, and a carboxylic acid functionalized alcohol, the polyurethane prepolymer comprising ester groups.

Embodiment 5

The composition of embodiment 1, 2 or 4, wherein the polyurethane is derived from a curative, a crosslinking agent, a carboxylic acid functionalized alcohol, and a prepolymer comprising one or more of the following: a diisocyanate-terminated polyester prepolymer; or an isocyanate-terminated diphenylmethane diisocyanate polyester prepolymer.

Embodiment 6

The composition of any one of embodiments 3 to 5, wherein the carboxylic acid functionalized alcohol comprises at least two hydroxyl groups.

Embodiment 7

The composition of any one of embodiments 3 to 6, wherein the carboxylic acid functionalized alcohol comprises 2,2-bis(hydroxymethyl)propionic acid.

Embodiment 8

The composition of any one of embodiments 1 to 7, wherein the powder comprises one or more of the following: an inorganic salt; an organic or inorganic acid; or an organic or inorganic base.

Embodiment 9

The composition of any one of embodiments 1 to 8, wherein the powder comprises one or more of the following: sodium chloride; silicates; aluminum hydroxide oxide; alumina; calcium oxide; adipic acid; or succinic acid.

Embodiment 10

The composition of any one of embodiments 1 to 9, wherein the fiber comprises one or more of the following: carbon fiber; glass fiber; or polymer fiber.

Embodiment 11

The composition of any one of embodiments 1 to 10, wherein the filler comprises the powder and the fiber.

Embodiment 12

The composition of any one of embodiments 1 to 11, wherein the weight ratio of the polyurethane to the filler is about 50:1 to about 1:1.

Embodiment 13

The composition of any one of embodiments 1 to 12, wherein the composition disintegrates into a liquid at a temperature equal to or lower than about 200° F. in a fluid comprising water or brine.

Embodiment 14

An article comprising the composition of any one of embodiments 1 to 13.

Embodiment 15

The article of embodiment 14, wherein the article is a pumpable tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

Embodiment 16

The article of embodiment 14, wherein the article is a tool that inhibits flow comprising a seal, a high pressure beaded frac screen plug, a screen basepipe plug, a coating for a balls and a seat, a compression packing element, an expandable packing element, an O-ring, a attached seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

Embodiment 17

A method of manufacturing a degradable article, the method comprising:
compressing a combination of a filler and a polyurethane forming composition at a temperature of about 20° C. to about 150° C. and a pressure of about 100 psi to about 10,000 to provide a molded part; and
heating the molded part at a temperature of about 60° C. to about 150° C. to provide the disintegrable article;
wherein the polyurethane forming composition comprises a first composition comprising a polyol component, a polyisocyanate component, and a first carboxylic acid functionalized alcohol; or a second composition comprising a polyurethane prepolymer, a curative, and a second carboxylic acid functionalized alcohol; or a combination of the first composition and the second composition.

Embodiment 18

A method to degrade an article, the method comprising:
exposing the article of any one of embodiments 14 to 16 to a fluid at a temperature of about 25° C. to about 300° C.

Embodiment 19

The method of embodiment 18, wherein the article is exposed to the fluid at a pressure of about 100 psi to about 15,000 psi.

Embodiment 20

The method of embodiment 18 or embodiment 19, wherein the fluid comprises water or brine.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:
1. A degradable polymer composition comprising:
a polyurethane comprising ester groups in a backbone of the polyurethane and carboxylic acid groups attached to the backbone of the polyurethane; and
a filler comprising a powder comprising particles having an average size of about 5 microns to about 500 microns or a combination of the powder and a fiber having an average length of about ⅛ inch to about 5 inches,
wherein the powder comprises one or more of the following: sodium chloride; a dissolvable silicate; aluminum hydroxide oxide; adipic acid; or succinic acid, the dissolvable silicate comprising about 66 to about 80 wt. % of $SiO_2$, about 0 to about 35 of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, each based on the total weight of the dissolvable silicate.

2. The composition of claim 1, wherein the carboxylic acid groups are present in an amount of about 1 wt. % to about 15 wt. % based on the total weight of the polyurethane.

3. The composition of claim 1, wherein the polyurethane is derived from a polyisocyanate, a polyol, and a carboxylic acid functionalized alcohol, and wherein at least one of the polyisocyanate and the polyol comprise polyester groups.

4. The composition of claim 3, wherein the carboxylic acid functionalized alcohol comprises at least two hydroxyl groups.

5. The composition of claim 4, wherein the carboxylic acid functionalized alcohol comprises 2,2-bis(hydroxymethyl)propionic acid.

6. The composition of claim 1, wherein the polyurethane is derived from a polyurethane prepolymer, a curative, and a carboxylic acid functionalized alcohol, the polyurethane prepolymer comprising ester groups.

7. The composition of claim 1, wherein the polyurethane is derived from a curative, a crosslinking agent, a carboxylic acid functionalized alcohol, and a prepolymer comprising one or more of the following: a diisocyanate-terminated polyester prepolymer; or an isocyanate-terminated diphenylmethane diisocyanate polyester prepolymer.

8. The composition of claim 1, wherein the filler comprises a combination of the fiber and the powder, and the fiber comprises one or more of the following: carbon fiber; glass fiber; or polymer fiber.

9. The composition of claim 1, wherein the filler comprises the powder and the fiber.

10. The degradable polymer composition of claim 9, wherein the weight ratio of the powder relative to the fiber is about 10:1 to about 1:1.

11. The composition of claim 1, wherein the weight ratio of the polyurethane to the filler is about 50:1 to about 1:1.

12. The composition of claim 1, wherein the composition disintegrates into a liquid at a temperature equal to or lower than about 200° F. in a fluid comprising water or brine.

13. An article comprising the composition of claim 1.

14. The article of claim 13, wherein the article is a pumpable tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

15. The article of claim 13, wherein the article is a tool that inhibits flow comprising a seal, a high pressure beaded frac screen plug, a screen basepipe plug, a coating for a balls and a seat, a compression packing element, an expandable packing element, an O-ring, a attached seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

16. The degradable polymer composition of claim 1, wherein the powder comprises the dissolvable silicate, and the dissolvable silicate comprises sodium silicate having a formula of $Na_2O \cdot SiO_2$, wherein the weight percent of $SiO_2$ relative to $Na_2O$ is about 3.22:1 to about 1:1.

17. A method of manufacturing a degradable article, the method comprising:
    compressing a combination of a filler and a polyurethane forming composition at a temperature of about 20° C. to about 150° C. and a pressure of about 100 psi to about 10,000 to provide a molded part, the filler comprising a powder comprising particles having an average size of about 5 microns to about 500 microns or a combination of the powder and a fiber having an average length of about ⅛ inch to about 5 inches; and
    heating the molded part at a temperature of about 60° C. to about 150° C. to provide the disintegrable article;
    wherein the polyurethane forming composition comprises a first composition comprising a polyol component, a polyisocyanate component, and a first carboxylic acid functionalized alcohol; or a second composition comprising a polyurethane prepolymer, a curative, and a second carboxylic acid functionalized alcohol; or a combination of the first composition and the second composition,
    wherein the powder comprises one or more of the following: sodium chloride; a dissolvable silicate; aluminum hydroxide oxide; adipic acid; or succinic acid, the dissolvable silicate comprising about 66 to about 80 wt. % of $SiO_2$, about 0 to about 35 of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, each based on the total weight of the dissolvable silicate.

18. A method to degrade an article, the method comprising:
    exposing the article to a fluid at a temperature of about 25° C. to about 300° C.,
    the article comprising a polyurethane that comprises ester groups in a backbone of the polyurethane and carboxylic acid groups attached to the backbone of the polyurethane; and a filler comprising one or more of the following: a powder comprising particles having an average particle size of about 5 microns to about 500 microns; or a combination of the powder with a fiber having an average length of about ⅛ inch to about 5 inches,
    wherein the powder comprises one or more of the following: sodium chloride; a dissolvable silicate; aluminum hydroxide oxide; adipic acid; or succinic acid, the dissolvable silicate comprising about 66 to about 80 wt. % of $SiO_2$, about 0 to about 35 of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, each based on the total weight of the dissolvable silicate.

19. The method of claim 18, wherein the article is exposed to the fluid at a pressure of about 100 psi to about 15,000 psi.

20. The method of claim 18, wherein the fluid comprises water or brine.

21. A degradable polymer composition comprising,
    a polyurethane comprising ester groups in a backbone of the polyurethane and carboxylic acid groups attached to the backbone of the polyurethane; and
    a filler comprising a fiber having an average length of about ⅛ inch to about 5 inches, or a combination of the fiber with a powder, the powder comprising particles having an average size of about 5 microns to about 500 microns or a combination of the powder,
    wherein the powder comprises one or more of the following: sodium chloride; a dissolvable silicate; aluminum hydroxide oxide; adipic acid; or succinic acid, the dissolvable silicate comprising about 66 to about 80 wt % of $SiO_2$, about 0 to about 35 of $Na_2O$, 0 to about 35 wt % of $K_2O$, 0 to about 20 wt % of CaO, and 0 to about 10 wt % of MgO, provided that the sum of the weights of $Na_2O$ and $K_2O$ is about 20 wt % to about 40 wt %, each based on the total weight of the dissolvable silicate, and
    the fiber comprises glass fiber, and the glass fiber contains a dissolvable silicate comprising about 66 to about 80 wt. % of $SiO_2$, about 0 to about 35 of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, each based on the total weight of the dissolvable silicate.

* * * * *